HANS H. FRANK & PETER HANSEN.
Improvement in Wind Mills.
No. 121,095.  Patented Nov. 21, 1871.
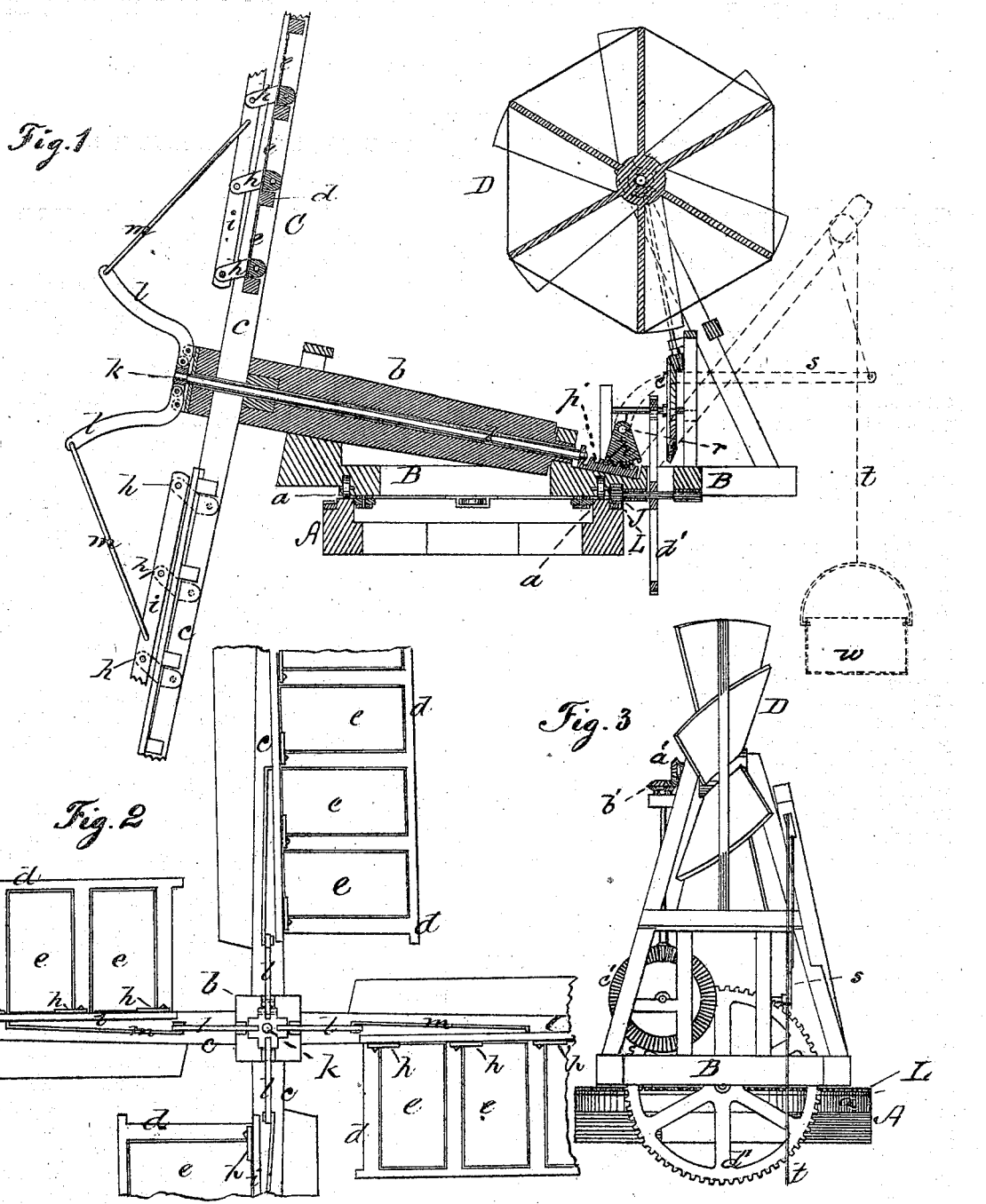

UNITED STATES PATENT OFFICE.

HANS HEINERICH FRANK AND PETER HANSEN, OF RICHTON, ILLINOIS.

IMPROVEMENT IN WINDMILLS.

Specification forming part of Letters Patent No. 121,095, dated November 21, 1871.

*To all whom it may concern:*

Be it known that we, HANS HEINERICH FRANK and PETER HANSEN, both of Richton, in the county of Cook and State of Illinois, have invented certain Improvements in Windmills, of which the following is a specification, reference being had to the accompanying drawing.

Our invention relates to wind-wheels; and consists in a novel manner of constructing the same, so as to run at a uniform rate of speed without regard to the variations of the wind, and also in the use of an auxiliary wheel and gearing by which the main wheel is kept with its face to the wind.

Figure 1 is a longitudinal vertical section through the middle of our wheel. Fig. 2 is a face view of the wheel. Fig. 3 is a rear face view of the same.

A represents a base provided with a circular rail or track, $a$, upon which is mounted a wheeled frame, B, so as to rotate freely, and upon this rotating frame is mounted the main wheel C and the auxiliary wheel D. The main wheel consists of a shaft, $b$, having four rigid arms, $c$, which stand at right angles to each other, and each of which has a rigid side frame, $d$, containing several hinged blades, $e$, as shown in Figs. 1 and 2, each frame $d$, with its blades, forming one of the large blades or vanes of the wheel. The frames $d$ stand obliquely to the plane of rotation, so that when the blades $e$ are closed into the frames the wind, acting upon them, forces the wheel around; but by turning the blades on their hinges they may be brought edgewise to the wind and the wheel allowed to stop. The blades $e$ are hinged at their sides or edges, and each provided with an arm, $h$, and the several arms of the set or series of blades in each frame $d$ are connected by a bar, $i$, so that all the blades in each set must turn together. Longitudinally through the main shaft $b$ there passes a sliding rod, $k$, which has its forward end connected to the inner ends of four radial levers, $l$, which are pivoted to the front end of the shaft, the outer ends of said levers being in turn connected by rods $m$ with the respective bars $i$, as shown in Figs. 1 and 2. When the rod $k$ is moved endwise it operates the four levers $l$, which, through rods $m$, move the bars $i$ and turn the different sets or series of blades $e$, all the blades in the wheel being thus opened or closed simultaneously by simply moving the rod in or out. As the blades are hinged at one side, the wind tends to turn them backward so as to present their edges thereto; but to prevent this a weight, $w$, is connected with the rod $k$ for the purpose of drawing the same inward, and thus holding the blades shut. The manner in which the weight is connected is clearly shown in Fig. 1, the inner end of the rod $k$ having a rack-bar, $p'$, swiveled to its end, and a rock-shaft, $r$, being mounted on the frame and provided with a pinion, $p$, working in said rack, and with an arm, $s$, to which is connected a cord, $t$, passing up over a fixed pulley and suspending the weight. The weighted cord, drawing upward on the arm, tends to turn the shaft and pinion, which latter draws the rack inward and holds the blades shut. Should the wind, however, increase beyond a certain point it will overcome the weight and force the blades open, so that they present less resistance, and thus prevent the wheel from increasing its speed.

It will therefore be seen that the wheel, constructed as described, will run at a fixed and uniform rate of speed, no matter what the force of the wind may be, and that the speed will not be affected by sudden gusts or flaws of wind. By changing the amount of weight on the cord the blades may be caused to open at any desired pressure, and thus the wheel regulated to run at any required speed.

On the rear end of the rotating main frame B, on which the wheel C is mounted, a small wind-wheel, D, is mounted so as to face in a plane at right angles to the face of the main wheel. This second wheel is constructed in the ordinary manner with rigid oblique blades, so as to be turned by a wind from any direction except straight against its edge. The shaft of this wheel D is provided with a pinion, $a'$, which, through intermediate gearing $b'$ $c'$ $d'$, operates a pinion, J, which is mounted in the frame B, and engages in a circular row of cog-teeth, L, secured around the outside of the track $a$ of base A, as shown in Figs. 1 and 3. When the parts are thus arranged it will be seen that as long as the wind blows directly against the face of the main wheel it will act against the edge of wheel D, which will remain at rest; but as soon as the wind shifts to either side it will strike the wheel D obliquely and set the same in motion, and that the wheel will operate the pinion J and turn the frame B until the main wheel is brought with its face toward the wind. In this manner the wheel C is caused to face the wind at all times. It is obvious that the weight *w* may be connected with the rod *k* in other ways than the one shown; for instance, the inner end of the rod may be provided with a swivel and a pulley placed on the frame behind the same, and then the chain by which the weight is suspended passed over the pulley and connected to the swivel so as to draw the rod inward. It is also obvious that any other suitable arrangement of gearing may be used between the wheel D and the rack; or the wheel D may be located by the side of the frame and have its shaft provided with a worm to engage in the rack L.

Having thus described our invention, we claim—

1. The combination of the wheel C, having the side frames *d* provided with the pivoted blades *e* attached to its arms *c*, with the sliding shaft *k*, weight *w*, and the intermediate connecting mechanism, when constructed and arranged substantially as and for the purpose set forth.

2. The combination of the wheel D, pinion J, and intermediate connecting mechanism with the cog-teeth L and wheel C, when constructed and arranged to operate substantially as and for the purpose set forth.

HANS HEINERICH FRANK.
PETER HANSEN.

Witnesses:
  OSCAR KLEINSCHMIDT,
  FRITZ FOLTZ. (118)